US011766930B2

(12) United States Patent
Blas Martinez et al.

(10) Patent No.: US 11,766,930 B2
(45) Date of Patent: Sep. 26, 2023

(54) ANTI-SIPHON DEVICE AND METHOD FOR OPERATION OF AN ANTI-SIPHON DEVICE

(71) Applicant: Ford Global Technologies, LLC, Dearborn, MI (US)

(72) Inventors: Luis Felipe Blas Martinez, Jilotepec (MX); Enrique Lopez Hernandez, Toluca (MX); Dhaval P. Vaishnav, Canton, MI (US); Daniel Hernandez, Coacalco (MX); Miguel Angel Leon Guerrero, Mexico City (MX); Kristian Ulyses Flores Aviña, Mexico City (MX); Frank Joseph Topolovec, Canton, MI (US); Mike Terrence Zitkovic, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 543 days.

(21) Appl. No.: 16/575,076

(22) Filed: Sep. 18, 2019

(65) Prior Publication Data

US 2021/0078403 A1   Mar. 18, 2021

(51) Int. Cl.
*B60K 15/04* (2006.01)
*B60K 15/03* (2006.01)

(52) U.S. Cl.
CPC  *B60K 15/0403* (2013.01); *B60K 2015/03434* (2013.01)

(58) Field of Classification Search
CPC ................. B60K 15/0403; B60K 2015/03434
USPC ....................................................... 220/86.3
See application file for complete search history.

(56) References Cited

U.S. PATENT DOCUMENTS

| | | | | |
|---|---|---|---|---|
| 637,285 A * | 11/1899 | Riedel | ................. | B01D 29/085 210/455 |
| 1,931,335 A * | 10/1933 | Terry | ................. | B60K 15/0403 220/86.3 |
| 7,284,540 B2 * | 10/2007 | Attwood | .............. | F02M 37/025 137/565.22 |
| 7,302,968 B2 * | 12/2007 | Stuart | ................. | B65D 88/544 141/286 |
| 7,721,902 B2 * | 5/2010 | Grote | ................. | B60K 15/0403 220/86.3 |
| D637,698 S * | 5/2011 | Greene | ....................... | D23/268 |
| 8,281,947 B2 | 10/2012 | Walowski et al. | | |
| 8,646,117 B2 * | 2/2014 | Avetisian | ................ | E03C 1/294 4/144.1 |
| 9,527,379 B2 | 12/2016 | Davito | | |
| 9,809,111 B1 | 11/2017 | Dana | | |
| 2003/0116202 A1 * | 6/2003 | Krishnamoorthy | .... | B60K 15/04 137/593 |
| 2003/0136448 A1 * | 7/2003 | Farrenkopf | ............ | B60K 15/04 137/538 |
| 2003/0201014 A1 * | 10/2003 | Krishnamoorthy | .... | B60K 15/04 137/542 |
| 2005/0211311 A1 * | 9/2005 | Gamble | ................ | B60K 15/04 137/590 |

(Continued)

*Primary Examiner* — Valentin Neacsu
*Assistant Examiner* — Eric C Baldrighi
(74) *Attorney, Agent, or Firm* — Vincent Mastrogiacomo; McCoy Russell LLP (57) ABSTRACT

An anti-siphon device and method for operation of an anti-siphon device is provided. The anti-siphon device includes a plurality of radially aligned fins that are unsupported at one end and attached to a carrier body at a second end.

20 Claims, 7 Drawing Sheets

(56) References Cited

U.S. PATENT DOCUMENTS

| | | | |
|---|---|---|---|
| 2006/0037648 A1* | 2/2006 | Krishnamoorthy | B60K 15/04 |
| | | | 137/592 |
| 2006/0065311 A1* | 3/2006 | Hattori | B60K 15/0403 |
| | | | 137/592 |
| 2010/0264138 A1* | 10/2010 | Bramson | B60K 15/0403 |
| | | | 220/86.3 |
| 2010/0282757 A1* | 11/2010 | Walkowski | B60K 15/0403 |
| | | | 220/86.3 |
| 2022/0185102 A1* | 6/2022 | Waymire | B60K 15/0403 |

* cited by examiner

ANTI-SIPHON DEVICE AND METHOD FOR OPERATION OF AN ANTI-SIPHON DEVICE

FIELD

The present description relates generally to an anti-siphon device and method for operation of said anti-siphon device.

BACKGROUND/SUMMARY

Vehicle fuel anti-siphon devices are used in fuel systems to reduce the likelihood of unwanted fuel tank siphoning. In some circumstances, anti-siphon devices may be incorporated into fuel systems to comply with regional guidelines. Fuel siphoning can be particularly problematic in vehicle fuel delivery systems utilizing alcohol (e.g., ethanol). Prior anti-siphon devices have included bars and screens fully spanning an interior filler pipe passage. One example approach is shown by Walkowski et al., in U.S. Pat. No. 8,281,947 B2, where an anti-siphon device having a plurality of bars arranged in a grid is disclosed. The bars are intended to prevent a siphoning tube from being inserted through the device.

The inventors have recognized several drawbacks with Walkowski's anti-siphon device as well as other anti-siphon devices. For example, due to the size and layout of the bars in Walkowski's device, the fuel pressure drop across the device, during refueling operation, surpasses a desirable level. The high pressure drop increases refueling time and may in some cases generate fuel backflow, leading to unwanted refueling shut-off. As a result, customer frustration may be increased.

The inventors have recognized the abovementioned drawbacks and developed an anti-siphon device for a fuel system to at least partially overcome some of the drawbacks. The anti-siphon device includes a carrier body arranged in a filler pipe downstream from a filler port. The anti-siphon device also includes a plurality of fins. The plurality of fins have radial alignment and are coupled to the carrier body at a first end, and are unsupported at a second end. This arrangement of fins decreases the pressure drop and flow restriction through the device. The radial arrangement of the fins, with fins of varying radial length, also reduces the volume of the device, decreasing the manufacturing cost of the device. In this way, the anti-siphon device can prevent unwanted fuel removal from a fuel tank and can also reduce losses associated with the device.

In one example, the radial length of the fins may vary from fin to fin, allowing for an additional decrease in the pressure drop across the fins while maintaining a desired siphoning tube-blocking functionality.

In another example, one or more of the plurality of fins may have a symmetric hydrofoil shape in cross-section. In this way, the flow separation of the fuel around the fins may be further reduced during refueling operation. Consequently, losses caused by the anti-siphon device during refueling can be further decreased, resulting in an additional decrease in tank refueling duration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Advantages and features of the present description will be apparent from the detailed description to follow, either taken alone or in conjunction with the accompanying figures shown below. It should be known that the description above is intended to introduce in a simplified matter a number of concepts that are described further in the detailed description. This summary is not intended to elucidate key features of the claimed subject material, the scope of which is defined uniquely by the claims that follow the detailed description. In addition, the claimed subject matter is not limited to implementations that solve any disadvantages noted above or in any part of this disclosure.

BRIEF DESCRIPTION OF THE DRAWINGS

FIGS. 2-7 and 10-13 are drawn to scale. However, other relative dimensions of the components may be used, in other embodiments.

DETAILED DESCRIPTION

Figure 1:
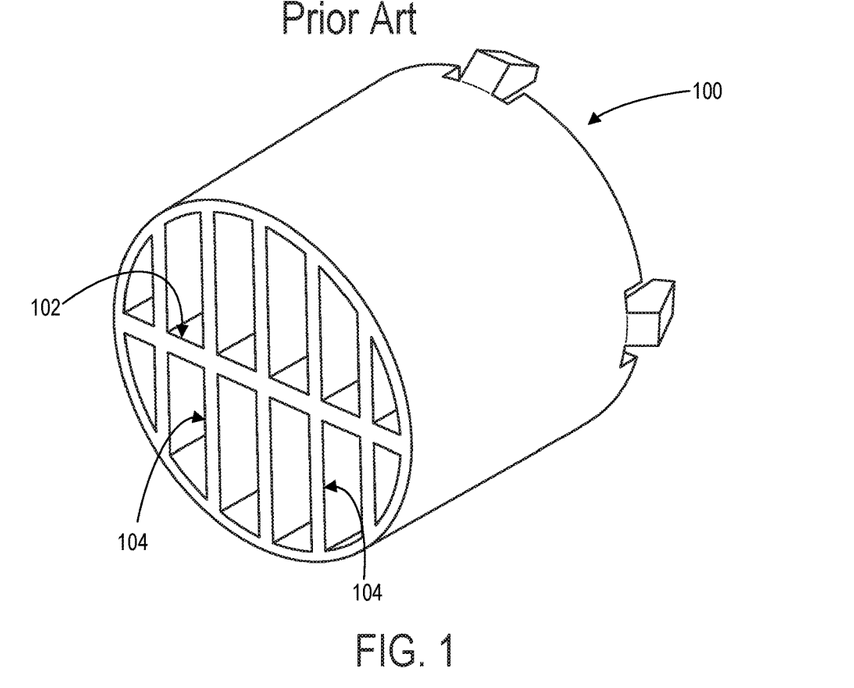
FIG. 1 shows a prior art anti-siphon device.
Figure 2:
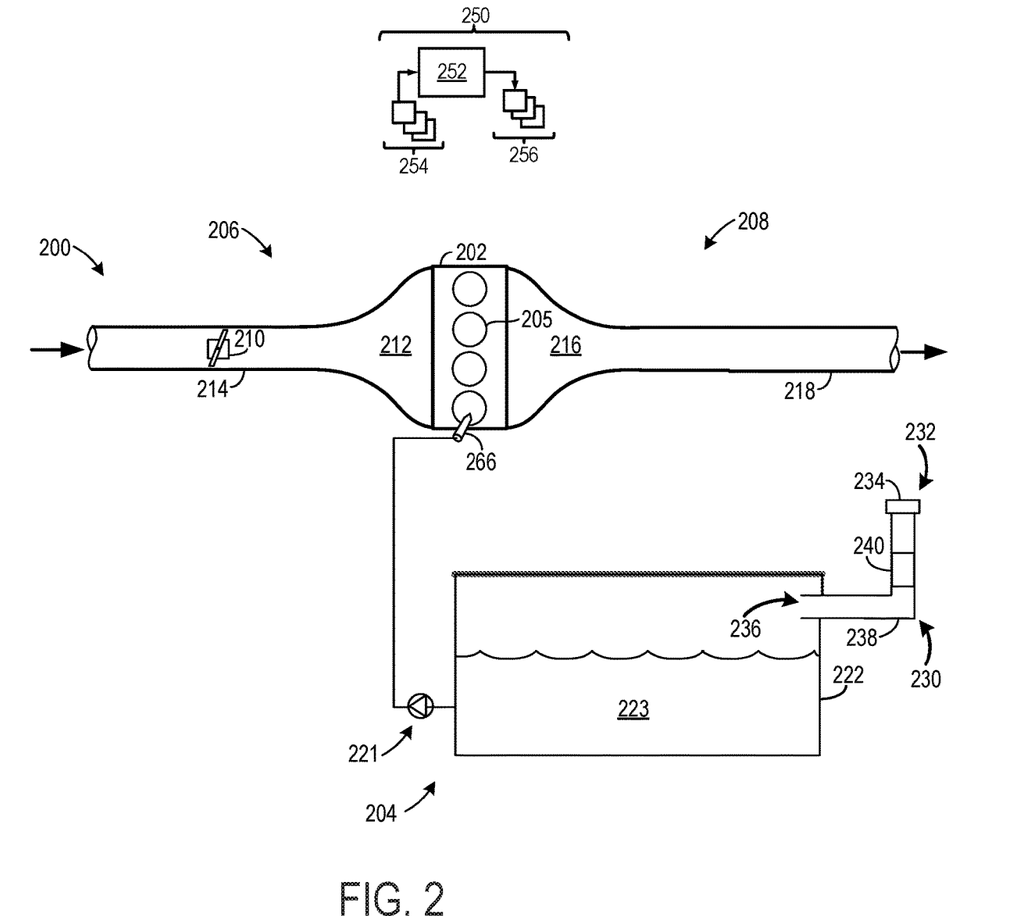
FIG. 2 is a schematic depiction of a vehicle engine with a fuel system having anti-siphon device.
Figure 3:
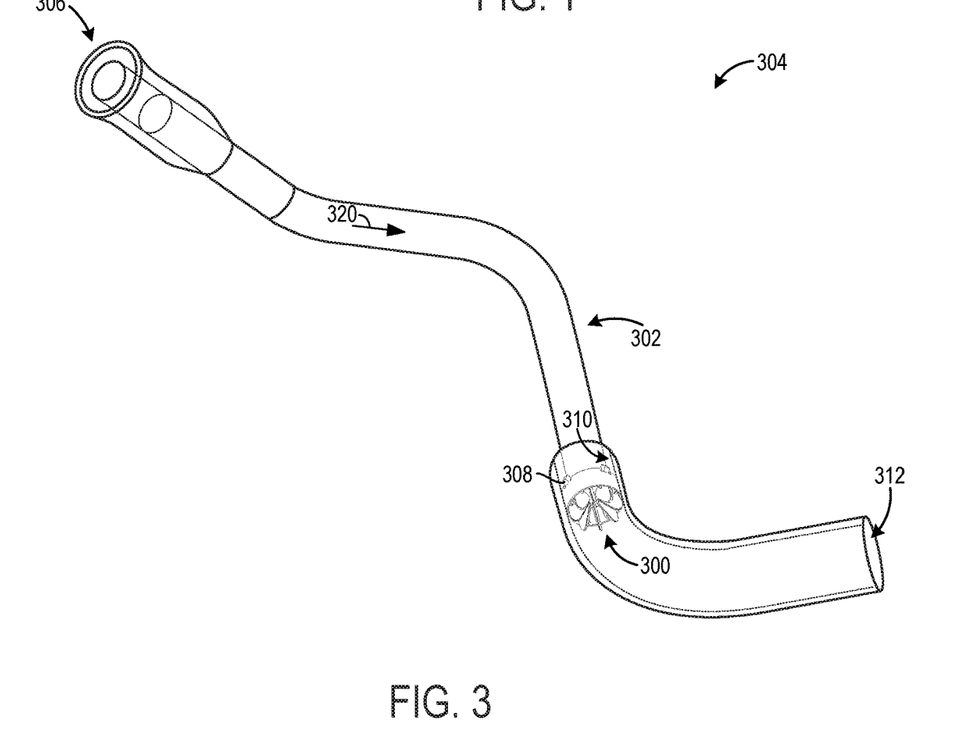
FIG. 3 illustrates a vehicle fuel filler tube with a first embodiment of an anti-siphon device.
Figure 4:
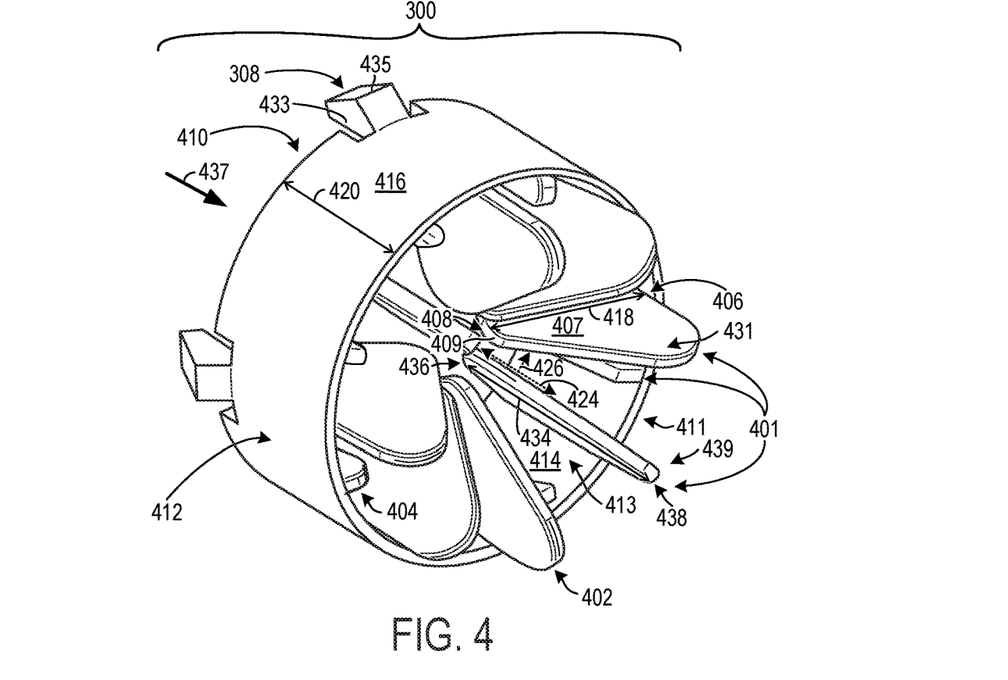
FIG. 4 shows a detailed view of the first embodiment of the anti-siphon device, shown in FIG. 3.
Figure 5:
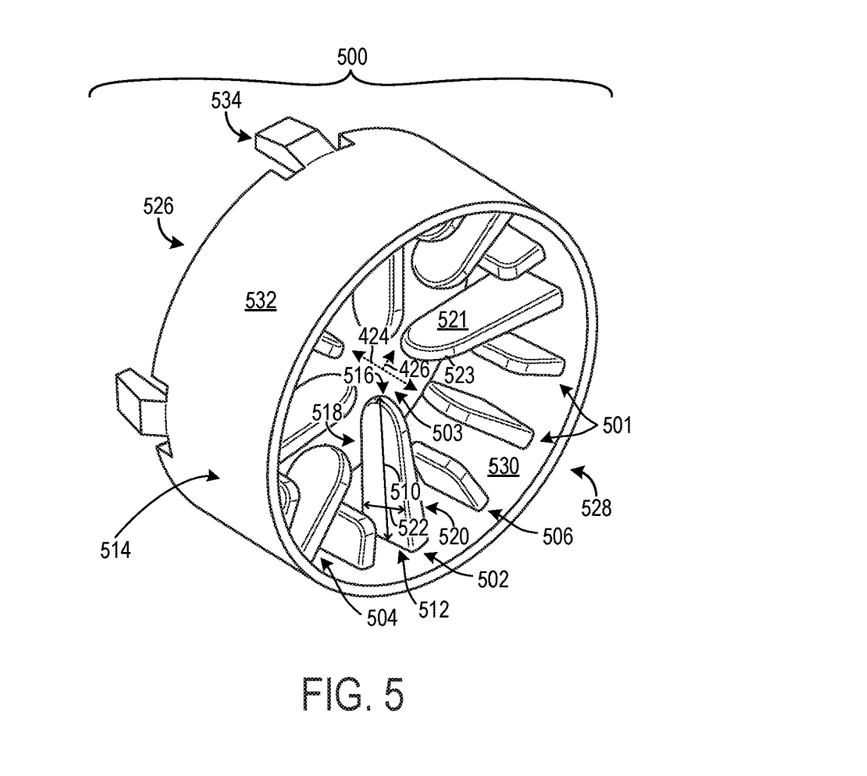
FIG. 5 shows a second embodiment of an anti-siphon device with fins.
Figure 6:
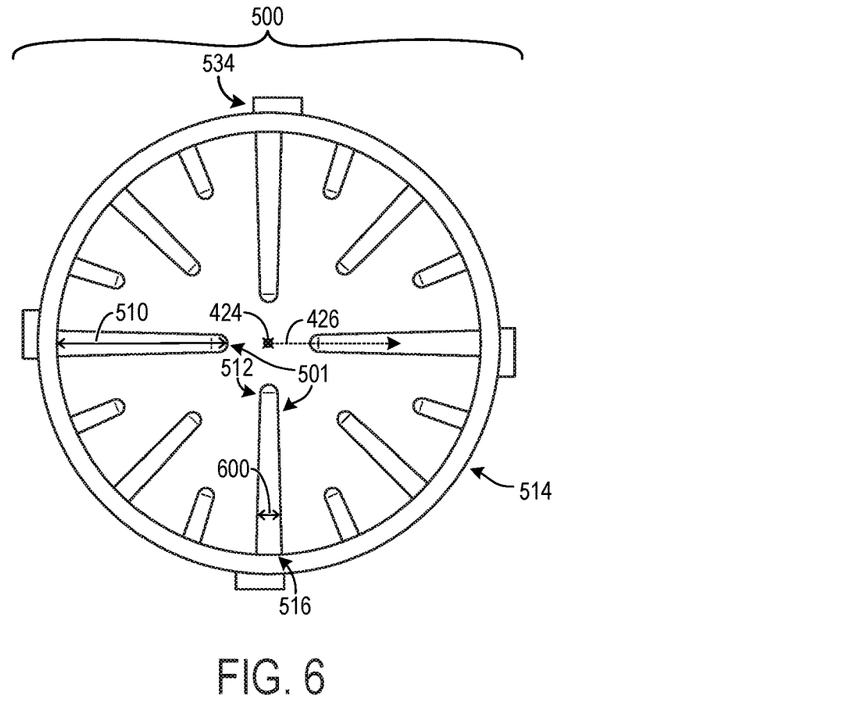
FIG. 6 shows a front view of the anti-siphon device, shown in FIG. 5.
Figure 7:
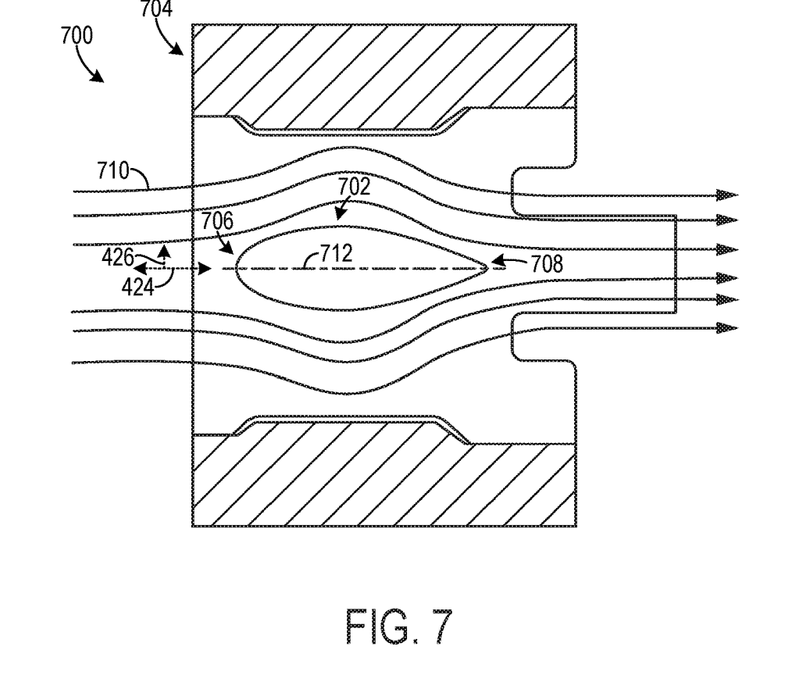
FIG. 7 shows a third embodiment of an anti-siphon device with fins having a hydro-foil shape.
Figure 8:
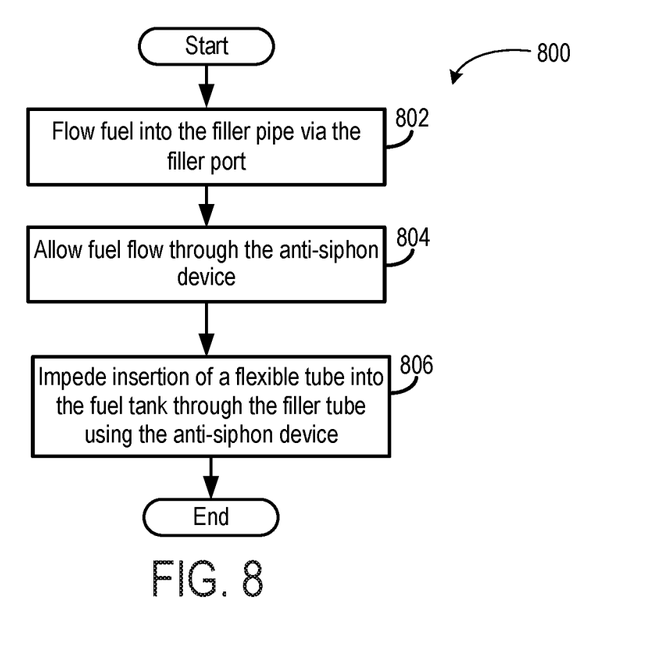
FIG. 8 shows a method for an anti-siphon device.
Figure 9:
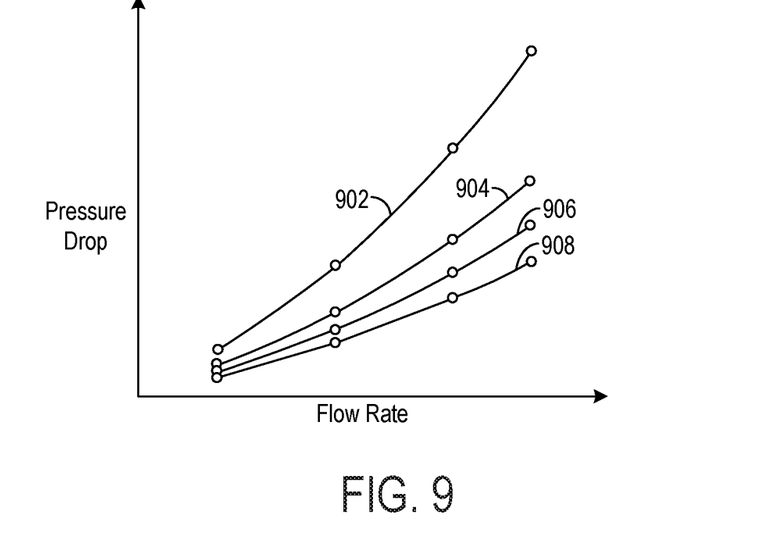
FIG. 9 shows a graphical representation of modeled fuel flow results through different anti-siphon device designs.
Figure 10:
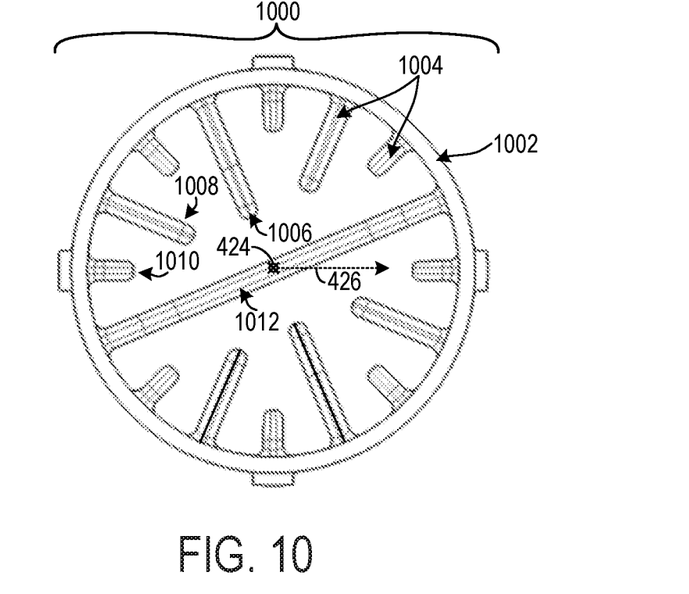
FIGS. 10-11 show a fourth embodiment of an anti-siphon device.
Figure 11:
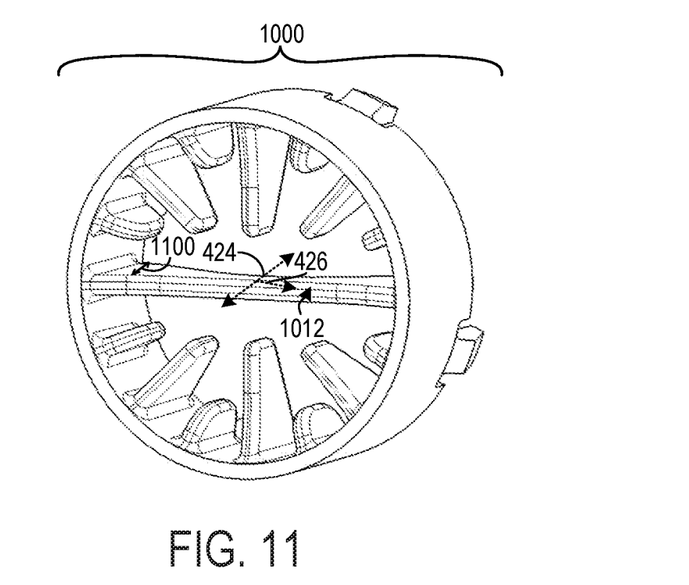
Figure 12:
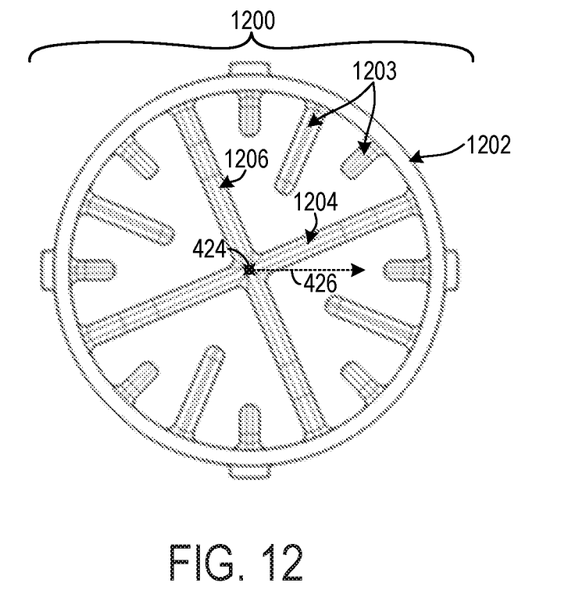
FIGS. 12-13 show a fifth embodiment of an anti-siphon device.
Figure 13:
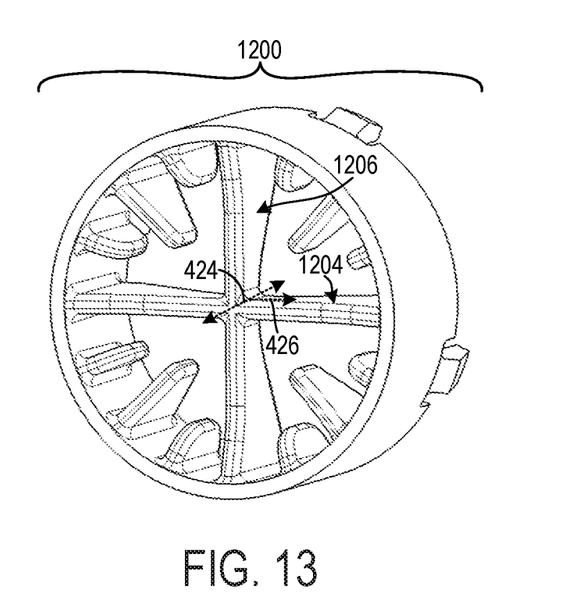

The following description relates to an anti-siphon device in a fuel system designed to reduce the chance of siphoning from a fuel tank while also decreasing pressure losses across the device during refueling of the tank. FIG. 1 illustrates a prior art anti-siphon device with a grid and horizontal and vertical bars. FIG. 2 depicts an engine system and fuel tank system that schematically includes a fuel filler tube with an anti-siphon device situated between the fuel filler port and the fuel tank. FIG. 3 shows a fuel filler system with a first example of an anti-siphon device situated downstream of the fuel filler port. FIG. 4 shows a detailed view of the first example of an anti-siphon device that features radial fins of differing lengths, allowing the device to achieve both a desired amount of siphoning tube blocking functionality while also decreasing losses generated by the device during refueling. FIG. 5 depicts a second embodiment of the anti-siphon device with radial fins of differing lengths. FIG. 6 illustrates a front view of the device embodiment shown in FIG. 5. FIG. 7 shows a cross-sectional view of a third embodiment of an anti-siphon device including a hydrofoil fin. FIG. 8 depicts a method for operation of an anti-siphon device. FIG. 9 illustrates use-case results of modeled flows corresponding to the different anti-siphon device embodiments. FIGS. 10-11 show a fourth embodiment of an anti-siphon device and FIGS. 12-13 shows a fifth embodiment of an anti-siphon device.

Turning to FIG. 1, a prior art an anti-siphon device 100 is illustrated. The anti-siphon device includes of a grid of horizontal 102 and vertical bars 104 extending completely across a housing 110. Arranging the bars in this manner can cause undesired fuel flow losses. The pressure decrease can cause a number of issues, especially during refueling, such as increasing the duration of refueling which may lead to customer frustration. The anti-siphon device 100 may also generate backpressure triggering refueling shut-off during some operating conditions. Consequently, customer dissatisfaction is further increased.

Referring now to FIG. 2, a schematic depiction of a vehicle system 200 is shown. The vehicle system 200 may be used in a vehicle, such as a car, truck, van, sports utility vehicle, recreational vehicle, etc. The vehicle system 200 includes an engine 202 coupled to a fuel system 204. The engine 202 includes one or more cylinders 205. For instance, the engine may include a single cylinder or multiple cylinders, as illustrated. The engine 202 includes an engine intake system 206 and an engine exhaust system 208. The engine intake system 206 includes a throttle 210 fluidly coupled to the engine intake manifold 212 via an intake passage 214. The engine exhaust system 208 includes an exhaust manifold 216 leading to an exhaust passage 218 that routes exhaust gas to the atmosphere.

Fuel system 204 may include a fuel tank 222 coupled to a fuel pump assembly 221. The fuel pump assembly 221 may include one or more pumps for pressurizing fuel delivered to the injectors of engine 202, such as the injector 266. While a single injector is shown, additional injectors may be provided for each cylinder. Fuel system 204 may be a return-less fuel system, a return fuel system, etc. Furthermore, the injector 266 is depicted as a direct injector. However, in additional or alternative examples, port injectors may be utilized.

Fuel tank 222 may hold one or more liquid fuels 223 such as gasoline, alcohol (e.g., ethanol, methanol, etc.) diesel, biodiesel, combinations thereof, etc. In one example, the fuel tank may be made of metal (e.g., aluminum, steel, combinations thereof, etc.) a polymeric material, combinations thereof, etc.

A fuel filler pipe 230 includes a first end 232 with a filler port 234 and a second end 236 opening into an interior region of the fuel tank 222. The fuel filler pipe 230 further includes a conduit 238 extending between the first and second ends. Thus, the fuel filler pipe 230 is in fluidic communication with the fuel tank 222.

An anti-siphon device 240 is positioned in the fuel filler pipe 230. The anti-siphon device 240 functions to reduce the chance of (e.g., prevent) a siphoning tube being inserted through the fuel filter tube and reaching the fuel stored in the fuel tank 222. Although the anti-siphon device 240 is depicted in an engine fuel delivery system, the anti-siphon device may be used in a variety of fuel systems such as fuel storage systems, generators, gardening equipment, etc. The anti-siphon device therefore has wide applicability to a variety of fuel systems. The anti-siphon device 240 is schematically illustrated in FIG. 1. However, the anti-siphon device has structural features described in greater detail herein with regard to FIGS. 3-7.

The vehicle system 200 may be controlled at least partially by a control system 250 including controller 252. Controller 252 may receive various signals from sensors 254 coupled to the engine 202 and send control signals to various actuators 256 coupled to the engine and/or vehicle to enable output of the engine to be adjusted as desired.

FIG. 3 shows an anti-siphon device 300 in a fuel filler pipe 302 of a fuel system 304. The fuel system 304, fuel filler pipe 302, and anti-siphon device 300 are examples of the fuel system 204, fuel filler pipe 230, and anti-siphon device 240, shown in FIG. 2. As such, the fuel system 304 shown in FIG. 3 may include at least a portion of the features of the fuel system 204, shown in FIG. 2, or vice versa.

The fuel filler pipe 302 includes a filler port 306. The filler port 306 receives a fuel nozzle during refueling. As such, fuel from a fuel nozzle fluidly connected to a fuel source may flow into the filler port during refueling operation. It will also be understood, that the filler port 306 may include a fuel cap, door, etc., in some embodiments.

The anti-siphon device 300 is situated inside the fuel filler pipe 302 to block siphoning tubes from passing through the device and reaching the fuel tank. In this way, the chance of unwanted fuel siphoning from the tank is reduced. The anti-siphon device includes various features enabling the siphoning tube blocking functionality to be achieved while also reducing a pressure drop across the device, occurring during refueling, when compared to prior anti-siphon devices. As a result, the anti-siphon device 300 can achieve a desired siphon tube blocking functionality while also decreasing flow losses during tank refueling operation. Consequently, the duration of refueling may be reduced along with a decrease in the chance of refueling shut-off being triggered.

The anti-siphon device 300 includes mounting clips 308 attaching to an interior wall 310 of the fuel filler pipe 302. To elaborate, the mounting clips 308 may mate with recesses in the interior wall 310 of the fuel filler pipe 302, when the device is installed, in one example. However, other device attachment techniques have been contemplated. For instance, bolts, adhesive(s), etc., may be used to attach the device to the filler pipe. FIG. 3 also shows a downstream end 312 of the fuel filler pipe 302. The downstream end 312 may be in fluidic communication with a fuel tank, such as the fuel tank 222, illustrated in FIG. 2. Arrow 320 depicts the general direction of fuel flow through the filler pipe 302 during refueling operation. As such, a downstream direction may be a direction corresponding to arrow 320 and upstream may be a direction opposing the direction indicated via arrow 320.

Turning now to FIG. 4, a detailed view of the anti-siphon device 300 is shown. The anti-siphon device includes a plurality of fins 401 having radial alignment. An axis system including a central axis 424 and radial axis 426 is illustrated in FIG. 4 as well as the remaining figures, where appropriate. It will be understood that a radial direction is any direction perpendicular to the central axis 424.

The fins 401 do not extend across the central axis 424, decreasing the device's frontal area when compared to previous devices which do not include cantilevered fins. To elaborate, each of the fins 401 is attached to the carrier body 412 at one end 406 and is unsupported at a second end 408, opposing the first end. The fins 401 also include opposing planar sides 407, in the illustrated example. However, other fin contours such as convex or concave sides may be used, in other examples. A curved surface 409 extends between the opposing planar sides 407 along the unsupported section of each of the fins. In this way, the flow separation from the fins may be reduced. However, in other examples, at least a portion of the surface extending between the planar sides 407 of the fin may have a different profile such as a planar profile, concave profile, dimpled profile, etc.

The fins 401 may be parsed into larger fins 402 and smaller fins 404. Thus, the fins have varying radial lengths.

Each of the larger fins may have a similar profile and/or each of the smaller fins may have a similar profile when compared to one another.

Sequential fins in the plurality of fins 401 may be uniformly angularly arranged with regard to the central axis 424. To elaborate, sequential fins may be separated by a substantially equivalent angle. Thus, the fins 401 may be symmetrically arranged. Arranging the fins in this manner can allow fuel flow across the device to be more evenly distributed when compared to non-symmetric fin layouts. However, non-symmetric fin arrangements may be used, in other examples.

In one example, the fins 401 may be spaced and profiled to block siphoning tubes having a diameter greater than or equal to a threshold value (e.g., 5.2 mm, 6 mm, 7 mm, etc.) while also decreasing the pressure drop across the device when compared to previous anti-siphon devices. As a result, siphon tube blocking functionality is achieve while decreasing losses generated by the device. The variation in size of the fins, the radial alignment of the fins, and/or the cantilevered attachment of the fins may allow the device to achieve the siphoning tube blocking functionality of tube with a diameter ≥5.2 mm, for example, while also achieving a desired flow pattern that does not generate a pressure drop across the device by greater than a desirable value. However, in other examples, the fins may be spaced to prevent siphoning tubes with different diameters from being inserted into the fuel tank through the filler pipe.

The fins 401 are coupled to a carrier body 412 at the first end 406, as previously discussed. For instance, the fins 401 may be constructed in unison with the carrier body 412. For example, the carrier body and fins may be molded, cast, or milled together. However, in other examples, the fins 401 may be welded, adhesively attached, bolted, etc., to the carrier body 412.

The carrier body 412 has a central opening 413 allowing additional fuel to pass through the device during refueling when compared to previous anti-siphon devices. Furthermore, the carrier body 412 has a cylindrical shape, in the illustrated example. However, other carrier body contours have been envisioned. It will be understood that the profile of the carrier body may be complimentary to the interior profile of the filler pipe in which the anti-siphon device is placed. Additionally, the carrier body 412 has an upstream side 410 and a downstream side 411. The carrier body 412 also has an interior surface 414 and exterior surface 416. A central passage extending along the central axis 424 is therefore located between the unsupported ends of the fins. In the illustrated example, the second end 432 is convexly curved to reduce losses generated by the anti-siphon device. However, in other examples, the second end of the fins may taper to a lesser extent or in some case remain un-tapered.

Each of the fins 401 also includes a leading edge 436 and a trailing edge 438. As shown, the leading edge 436 and the trailing edge 438 are convexly curved (e.g., rounded) to further decrease flow occurring during refueling. However, in other examples, at least one of the trailing edge and/or the leading edge may be at least partially planar. Thus, in other embodiments the fins may have alternate sizes and/or shapes.

Each of the fins 401 has a radial length 418. Thus, each of the fins 401 extends inward towards the central axis 424. Additionally, the larger fins 402 have an axial length 434 that is longer than the axial length 420 of the carrier body 412, in the illustrated example. Thus, a portion (e.g., rear side 439) of the fins are offset from the carrier body 412. Shaping the larger fins in this manner decreases fuel flow swirling and skewness, making fuel flow more uniform. Consequently, refueling operation may unfold more quickly and the likelihood of unintended fuel nozzle shut-off during refueling, due to back-pressure, is reduced. Furthermore, the axial lengths 434 of fins 401 are longer than in the device embodiment, depicted in FIGS. 5-6. The axial lengths may be measured along an axis parallel to the central axis and from a location that is furthermost upstream on the fin and/or furthermost downstream on the fin. Upstream and downstream as described herein correspond to a general direction of fuel flow through the device and filler pipe during refueling, indicated via arrow 437. By increasing the axial lengths of the fins the structural integrity of the device is increased. However, fin shapes with shorter lengths such as configurations where the trailing sides of the fins are not offset from the downstream side of the carrier body have been envisioned.

The larger fins 402 are also shown including a tapered section 431. To elaborate, the larger fins include rearward sections tapering in a downstream direction. Tapering the fins 401 in this manner may reduce flow losses generated by the anti-siphon device 300.

Additionally, the fins 401 do not extend past of the upstream side 409 of the cylindrical carrier body 412, in the illustrated example. However, in other examples, the upstream sides of the fins may axially extend beyond the upstream side of the carrier body.

The mounting clips 308 in the anti-siphon device 300 are also depicted in FIG. 4. As previously discussed, the mounting clips 308 are used to attach the device 300 to the fuel filler pipe 302, shown in FIG. 3. To achieve the attachment functionality the mounting clips 308 may include a flexible body 433 and a tab 435 which may snap into an indent in the filler pipe. However, other clip attachment structures have been envisioned.

FIG. 5 shows another embodiment of an anti-siphon device 500. The anti-siphon device 500 includes several different features from the anti-siphon device 300, shown in FIGS. 3-4. For instance, the fins 501 in the anti-siphon device 500 have a different profile than the fins 401 in the device 300, shown in FIGS. 3-4. However, the devices also share some common functional and structural features. As such, redundant description is omitted for brevity. Furthermore, devices with other combinations of structural and/or functional features taken from the device embodiments described herein have also been contemplated.

The anti-siphon device 500 includes a plurality of fins 501 having radial alignment. To elaborate, the fins 501 extend radially toward the central axis 424 but do not extend across the central axis. Therefore, a central passage 503 extends along the central axis 424 between unsupported ends 516 of the fins 501. The fins 501 also extend in an axial direction.

The fins 501 may be parsed into larger fins 502, medium fins 504, and smaller fins 508. Thus, the fins 501 have a varying radial lengths 510. It will be understood, that when the fins are shaped in this manner, siphoning tubes having a diameter greater than or equal to a threshold value, such as 5.2 mm, may be inhibited from being inserted through the device while also decreasing pressure drop across the device. Each of the fins 501 again includes a first end 512 coupled to a carrier body 514 and a second unsupported end 516. The second unsupported end 516 opposes the first end 512.

The fins 501 additionally include a leading edge 518 and a trailing edge 520. In the illustrated example, the leading edge 518 and the trailing edge 520 are convexly curved. However, other edge contours have been envisioned such as planar contours. The fins 501 also include two opposing planar surfaces 521. However, in other examples the opposing surfaces in the fins may have other contours such as convex contours, concave contours, dimpled contours, combinations thereof, etc. The surface 523 extending between the opposing planar surfaces 521 is convexly curved, in the illustrated example. However, at least a portion of the surface 523 may be planar, in other examples.

The fins 501 are also shown tapering in a radial direction extending toward the central axis 424. As a result, the pressure drop across the device during refueling can be further reduced. However, in other examples, the axial length 522 of the fins 501 may be substantially constant from the first end 512 to the unsupported end 516.

The carrier body 514 is cylindrical in shape in the illustrated example. However, as previously discussed other carrier body contours have been envisioned. The carrier body 514 includes an upstream side 526, a downstream side 528, an interior surface 530, and an exterior surface 532.

The anti-siphon device 500 again includes mounting clips 534 enabling the device to be attached to a fuel filler pipe. In this way, the device may be efficiently attached to a filler pipe. The fins 501, in the illustrated example, do not extend beyond the upstream or downstream sides 526 and 528, respectively, of the carrier body 524, in the illustrated example. In this way, flow losses across the fins 501 may be decreased when compared to the anti-siphon device 300, shown in FIGS. 3-4. However, in other instances, the fins 501 may extend beyond the upstream and/or downstream sides of the carrier body.

FIG. 6 shows a front view of the anti-siphon device 500. Again, the fins 501, carrier body 514, and mounting clips 534 are illustrated. A width 600 of the fins 501 is also indicated in FIG. 6. The width of the fins does not substantially vary, in the illustrated example. However, in other examples, the fin width may vary. The radial length 510, the unsupported ends 516, and the first ends 512 of the fins 501 are again illustrated in FIG. 6.

FIG. 9 shows graphical representations of computational fluid dynamic (CFD) analyses of the different anti-siphon device embodiments described herein in a use-case example. To elaborate, the CFD results correspond to a pressure drop in a filler pipe having the different anti-siphoning devices placed therein. Therefore, the results correspond to a specific filler pipe and devices and do not apply to the entire fuel system. In the CFD modeling the filler pipe's characteristics were defined. As such, the results plotted in FIG. 9 corresponds to a specific filler pipe design. Nevertheless, the pressure drop behaviors corresponding to the different anti-siphon devices are expected to occur in other filler pipe designs. It will however be understood, that the restriction added by the different devices will vary based on external fuel system factors such as fuel tank design, valve design, filler pipe design, etc.

Flow rate of fuel through the filler pipe and anti-siphon devices is indicated on the abscissa and pressure drop across the filler pipe and the anti-siphon devices is indicated on the ordinate. Although specific numerical values are not indicated on either the ordinate or abscissa, it will be understood that the relative magnitudes of flow rate and pressure drop values may be inferred from the plots.

Plot 902 indicates the modeled results with regard to the prior art siphoning device, indicated in FIG. 1. Plot 904 indicates the modeled results with regard to the anti-siphon device embodiment, shown in FIGS. 3-4. Plot 906 indicates the modeled results with regard to the anti-siphon device embodiment shown in FIGS. 5-6. Plot 908 indicates modeled results in a filler tube without an anti-siphon device. Therefore, plot 908 corresponds to the lowest amount of flow losses in the filler pipe that are theoretically possible.

As shown, the embodiments of the anti-siphon devices, shown in FIGS. 3-4 and 5-6, are both less restrictive than the prior art device, shown in FIG. 1. Specifically, in one example, at a fuel flow rate of 12 gallons per minute (GPM) the anti-siphon device, shown in FIGS. 5-6, would add a 28% restriction when compared to the flow restriction in a filler pipe without an anti-siphoning device (i.e., plot 908). Furthermore, in one example, at a fuel flow rate of 12 GPM, the anti-siphon device, shown in FIGS. 3-4, would add a 61% flow restriction when compared to plot 908. Additionally, at a fuel flow rate of 12 GPM, the prior art anti-siphon device, shown in FIG. 1, would add a 156% flow restriction when compared to plot 908. Thus, the anti-siphon devices shown in FIGS. 3-6 achieve significant reductions in flow restriction when compared to previous devices.

Furthermore, the anti-siphon device embodiment shown in FIGS. 5-6 may reduce the frontal area in comparison to the prior art anti-siphon device, shown in FIG. 1 by 28.6%, in one example. Additionally, the total volume of the anti-siphon device embodiment shown in FIGS. 5-6 may be reduced by 56% when compared to the prior art device, shown in FIG. 1, in one example.

Another embodiment of an anti-siphon device 700 is illustrated in FIG. 7 in cross-section. The cross-sectional cutting plane extends through one of a plurality of fins 702. The plurality of fins 702 extend from the carrier body 704. The fins have a hydrofoil shape enabling further reductions in flow losses across the device. As described herein, a hydrofoil shape is a shape exhibiting curvature at a leading edge which maintains curvature on two opposing sides along the length of the shape to a trailing edge. To elaborate, each of the fins 702 is rounded on its leading edge 706 and trailing edge 708 to decrease turbulence generated by the fins, thereby decreasing pressure losses and increasing fuel flow-rate during refueling. The fuel tank can therefore be refilled more quickly when compared to anti-siphon devices with sharper edges. Again, in the device embodiment shown in FIG. 7, each of the plurality of the fins 702 is coupled to the carrier body 704 on one end and is unsupported on the other end. The fins 702 also again extend towards the central axis 424 of the anti-siphon device. Arrows 710 indicate the general direction of fuel flow through the anti-siphon device 700 during refueling operation. However, it will be appreciated that the fluid flow has greater complexity that is not captured by the arrows. The fluid flow indicated via arrows 710 exhibits less flow separation when compared to non-hydrofoil shaped devices.

The fin 702 has, in the illustrated example, a symmetric shape in cross-section with regard to a radially aligned plane 712. Designing the fin with this type of symmetry decrease flow variability to further reduce pressure loss across the device. However, other fin shapes have been contemplated.

FIGS. 10-11 show a fourth embodiment of an anti-siphon device 1000. It will be understood that the device 1000 may include features from the other device embodiments described herein. The anti-siphon device 1000 again includes a carrier body 1002 and a plurality of fins 1004. The plurality of fins may be parsed into longer fins 1006, medium fins 1008, and shorter fins 1010. The plurality of fins are again radially aligned. However, a structural fin 1012 spanning the carrier body 1002 is also provided. The structural fin 1012 spanning the carrier body may be provided to increase the device's rigidity. Increased device rigidity may be desired in certain fuel systems. Fuel system characteristics such as filler pipe diameter, filler pipe contour, filler pipe flexibility, etc., may be taken into account when selecting the device's rigidity. FIG. 11 also shows the structural fin 1012 with an axial width 1100 tapering in a direction extending toward the central axis 424. FIG. 11 also shows a device design where the fins have an axial width that is not greater than the axial width of the carrier body. However, devices with fins having other profiles may be used, in other embodiments.

FIGS. 12-13 show a fifth embodiment of an anti-siphon device 1200. It will be understood that the device 1200 may include features from the other device embodiments described herein. The anti-siphon device 1200 again includes a carrier body 1202 and a plurality of radially aligned fins 1203. Additionally, a first structural fin 1204 and a second structural fin 1206 are provided in the device 1200. The first structural fin 1204 and the second structural fin 1206 extend through the central axis 424 and span the carrier body 1202. The first structural fin 1204 and the second structural fin 1204 are arranged perpendicular to one another, in the illustrated embodiment. However, other relative arrangements between the first and second structural fins have been envisioned.

FIGS. 2-7 and 10-13 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 8 shows a method 800 for use of an anti-siphon device. Instructions for carrying out method 800 may be at least partially executed by a controller based on instructions stored in memory of a controller and in conjunction with signals received from sensors of the engine system, such as the sensors and controller described above with reference to FIG. 2. The controller may employ engine actuators of the engine system to adjust engine operation, according to the methods described below. However, it will also be understood that at least a portion of the method steps may be passively and/or manually implemented.

At 802 the method includes flowing fuel into a filler pipe via a fuel port. Next, at 804 the method includes allowing fuel flow through the anti-siphon device. The anti-siphon device achieves reduced flow restriction when compared to devices with bars fully spanning the interior flow passage in the device.

At 806 the method includes impeding insertion of a flexible tube into the fuel tank through the filler pipe using the anti-siphon device. As previously, discussed the cantilevered fins may be arranged such that a siphon tube, having a diameter of ≥5.2 mm for example, may be stopped from passing through the anti-siphon device. As a result, the likelihood of the fuel tank siphoning is reduced.

The technical effect of including radially aligned fins that are unsupported at one end in an anti-siphon device is to block a siphoning hose from being inserted through the device while also reducing the amount of pressure drop across the device during refueling of a downstream fuel tank. As a result, the likelihood of fuel siphoning from the downstream fuel tank is reduced and the flowrate at which the fuel flows into the fuel tank during refueling is increased. Furthermore, by decreasing the pressure drop across the device during refueling operation the chance of prematurely triggering fuel shut-off is decreased.

The invention will be further described in the following paragraphs. In one aspect, an anti-siphon device is provided that comprises a carrier body coupled to an interior surface of a filler pipe downstream of a filler port, a plurality of fins having radial alignment, where each of the plurality of fins is coupled to the carrier body at a first end, unsupported at a second end, and extends from the carrier body toward a central axis of the anti-siphon device.

In another aspect, a method is provided that comprises impeding insertion of a flexible tube into a fuel tank through a filler pipe using an anti-siphon device, the fuel tank storing a liquid fuel; and permitting fuel flow through the anti-siphon device, the anti-siphon device comprising a carrier body coupled to an interior surface of the filler pipe downstream of a filler port; and a plurality of fins having radial alignment, where each of the plurality of fins is coupled to the carrier body at a first end, unsupported at a second end, and extends from the carrier body toward a central axis of the anti-siphon device.

In yet another aspect, a fuel delivery system in a vehicle is provided, comprising a filler pipe in fluidic communication with a fuel tank and including a filler port, the fuel tank storing a liquid fuel, and an anti-siphon device comprising a carrier body coupled to an interior surface of a filler pipe downstream of a filler port and a plurality a fins having radial alignment, where each of the plurality of fins is coupled to the carrier body at a first end, unsupported at a second end, and extends from the carrier body towards a central axis of the anti-siphon device.

In any of the aspects or combinations of the aspects, the anti-siphon device may further comprise of a plurality of fins that do not extend through the central axis of the anti-siphon device.

In any of the aspects or combinations of the aspects, the plurality of fins may not extend through the central axis of the anti-siphon device.

In any of the aspects or combinations of the aspects, radial lengths of two or more fins in the plurality of fins may vary.

In any of the aspects or combinations of the aspects, the plurality of fins may include a first set of fins having a smaller radial length than a second set of fins.

In any of the aspects or combinations of the aspects, one more of the plurality of fins may have a symmetric hydrofoil shape in cross-section.

In any of the aspects or combinations of the aspects, a rear side of each of the plurality of fins may be axially offset from the carrier body.

In any of the aspects or combinations of the aspects, a leading edge of each of the plurality of fins may be curved.

In any of the aspects or combinations of the aspects, the plurality of fins may extend in a direction parallel to the central axis.

In any of the aspects or combinations of the aspects, the second end may have a convex profile.

In any of the aspects or combinations of the aspects, a diameter of the flexible tube may be greater than or equal to 5.2 mm.

In any of the aspects or combinations of the aspects, the plurality of fins may extend in a direction parallel to the central axis.

In any of the aspects or combinations of the aspects, radial lengths of the plurality of fins may vary and where the plurality of fins may be spaced apart to prevent a flexible tube having a diameter greater than or equal to 5.2 mm from being inserted through the anti-siphon device.

In any of the aspects or combinations of the aspects, a leading edge and a trailing edge of each of the plurality of fins may be curved.

In any of the aspects or combinations of the aspects, each of the plurality of fins may taper in a downstream direction.

In any of the aspects or combinations of the aspects, each of the plurality of fins may be symmetric about a radially aligned plane.

In any of the aspects or combinations of the aspects, the plurality of fins may be symmetrically arranged with regard to the central axis.

In any of the aspects or combinations of the aspects, the anti-siphon device may further comprise a first structural fin spanning the carrier body.

In any of the aspects or combinations of the aspects, the anti-siphon device may further comprise a second structural spanning the carrier body and arranged perpendicular to the first structural fin.

In another representation, a siphon-blocking device is provided that includes an outer housing with a flow channel around a central axis and a plurality of radially aligned cantilevered struts extending toward the central axis but not across the central axis, where the radially aligned cantilevered struts have varying radial lengths.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller. However, in some examples, at least a portion of the steps may be passively implemented.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "substantially" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An anti-siphon device, comprising:
a carrier body coupled to an interior surface of a filler pipe downstream of a filler port; and
a plurality of cantilevered fins having radial alignment, where circumferentially adjacent cantilevered fins of the plurality of cantilevered fins around the carrier body differ in radial length, where diametrically opposed cantilevered fins of the plurality of cantilevered fins are substantially a same length, where each of the plurality of cantilevered fins is coupled to the carrier body at a first end, is unsupported at a second end, and extends from the carrier body toward a central axis of the anti-siphon device such that the second end for each of the plurality of cantilevered fins is adjacent to the central axis, and where each of the plurality of cantilevered fins is positioned at a common axial position along an axial length of the carrier body.

2. The anti-siphon device of claim 1, where the plurality of cantilevered fins are planar fins extending towards the central axis and do not extend through the central axis of the anti-siphon device, where the carrier body includes a plurality of mounting clips at a first axial end, and where the plurality of cantilevered fins extend axially past an edge of the carrier body at a second axial end opposite the first axial end.

3. The anti-siphon device of claim 1, where the plurality of cantilevered fins include a first set of cantilevered fins having a smaller radial length than a second set of cantilevered fins, where each of the first set of cantilevered fins and the second set of cantilevered fins include at least two cantilevered fins, and where there are no cantilevered fins extending through the central axis of the anti-siphon device.

4. The anti-siphon device of claim 1, where one or more of the plurality of cantilevered fins have a symmetric hydrofoil shape in cross-section.

5. The anti-siphon device of claim 1, further comprising a first structural fin spanning the carrier body.

6. The anti-siphon device of claim 5, further comprising a second structural fin spanning the carrier body and arranged perpendicular to the first structural fin, where the plurality of cantilevered fins includes more than four cantilevered fins.

7. The anti-siphon device of claim 1, where a leading edge of each of the plurality of cantilevered fins is curved.

8. The anti-siphon device of claim 1, where the plurality of cantilevered fins extend in a direction parallel to the central axis, and where the plurality of cantilevered fins are substantially coplanar around the central axis such that the plurality of cantilevered fins are on substantially a same plane.

9. The anti-siphon device of claim 1, where the second end has a convex profile.

10. A method, comprising:
impeding insertion of a flexible tube into a fuel tank through a filler pipe using an anti-siphon device, the fuel tank storing a liquid fuel; and
permitting fuel flow through the anti-siphon device, the anti-siphon device comprising:
a carrier body coupled to an interior surface of the filler pipe downstream of a filler port; and
a plurality of cantilevered fins having radial alignment, where circumferentially adjacent cantilevered fins of the plurality of cantilevered fins around the carrier body differ in radial length, where diametrically opposed cantilevered fins of the plurality of cantilevered fins are substantially a same length, where each of the plurality of cantilevered fins is coupled to the carrier body at a first end, is unsupported at a second end, and extends from the carrier body toward a central axis of the anti-siphon device such that the second end for each of the plurality of cantilevered fins is adjacent to the central axis, where the carrier body includes a plurality of mounting clips at a first axial end, where the plurality of cantilevered fins extend axially past an edge of the carrier body at a second axial end opposite the first axial end, and where there are no fins extending through the central axis of the anti-siphon device.

11. The method of claim 10, where the plurality of cantilevered fins include a first set of fins having a smaller radial length than a second set of fins.

12. The method of claim 10, where a diameter of the flexible tube is greater than or equal to 5.2 mm.

13. The method of claim 10, where the liquid fuel includes alcohol, and where the plurality of cantilevered fins is a total of sixteen cantilevered fins.

14. The method of claim 10, where the plurality of cantilevered fins extend in a direction parallel to the central axis.

15. A fuel delivery system in a vehicle, comprising:
a filler pipe in fluidic communication with a fuel tank and including a filler port, the fuel tank storing a liquid fuel; and
an anti-siphon device, comprising:
a carrier body coupled to an interior surface of the filler pipe downstream of the filler port; and
a plurality of cantilevered fins having radial alignment, where circumferentially adjacent cantilevered fins of the plurality of cantilevered fins around the carrier body differ in radial length, where diametrically opposed cantilevered fins of the plurality of cantilevered fins are substantially a same length, where each of the plurality of cantilevered fins is coupled to the carrier body at a first end, is unsupported at a second end, and extends from the carrier body toward a central axis of the anti-siphon device such that the second end for each of the plurality of cantilevered fins is adjacent to the central axis, where the carrier body includes a plurality of mounting clips at a first axial end, where the plurality of cantilevered fins extend axially past an edge of the carrier body at a second axial end opposite the first axial end, and where there are no fins extending through the central axis of the anti-siphon device.

16. The fuel delivery system of claim 15, where radial lengths of the plurality of cantilevered fins varies such that there are three sub-groups of the plurality of cantilevered fins each with a different radial length, and where the plurality of cantilevered fins are spaced apart to prevent a flexible tube having a diameter greater than or equal to 5.2 mm from being inserted through the anti-siphon device.

17. The fuel delivery system of claim 15, where the plurality of cantilevered fins are symmetrically arranged with regard to the central axis.

18. The fuel delivery system of claim 15, where a leading edge and a trailing edge of each of the plurality of cantilevered fins are curved.

19. The fuel delivery system of claim 15, where each of the plurality of cantilevered fins tapers in a downstream direction.

20. The fuel delivery system of claim 15, where each of the plurality of cantilevered fins is symmetric about a radially aligned plane.

* * * * *